United States Patent [19]

Sorbie

[11] 3,819,047
[45] June 25, 1974

[54] BOTTLE GAUGING APPARATUS AND METHOD

[75] Inventor: Thomas B. Sorbie, Toledo, Ohio
[73] Assignee: Owens-Illinois, Inc., Toledo, Ohio
[22] Filed: June 5, 1973
[21] Appl. No.: 367,127

[52] U.S. Cl.................. 209/80, 200/61.42, 209/90
[51] Int. Cl. ............................................. B07c 5/08
[58] Field of Search ........ 200/61.42, 61.43; 209/75, 209/80, 82, 88, 90

[56] References Cited
UNITED STATES PATENTS

| | | | |
|---|---|---|---|
| 2,689,647 | 9/1954 | Hofstetter............................ | 209/90 |
| 3,279,599 | 10/1966 | Drennan ........................... | 209/88 R |
| 3,420,369 | 1/1969 | Sorbie................................ | 209/80 |

*Primary Examiner*—Richard A. Schacher
*Attorney, Agent, or Firm*—Steve M. McLary; E. J. Holler

[57] ABSTRACT

Apparatus for gauging the upper rim surface of a glass container for height as well as a symmetrical defect known as "warp." A warp gauge is disclosed in which a container is rotated about its vertical axis in a predetermined location. A pair of differential transformers are connected in series adding relationship having their armatures connecting contact members engageable with diametrically opposed points on the container rim. An output signal is produced proportional to the height difference of the contact members and a reject is provided when this signal exceeds a predetermined value. A pair of tapered guide members are added to engage the rim of the container as it is moved into position. These guide members are located alongside the contact members and raise the contact members just to the height of contact with the rim of the container, preventing damage to the container and to the guide members as the container is moved into inspection alignment. In addition, a separate rim sensing arm is provided to sense the presence of the rim of the container, being engaged by the rim of the container as it is moved into inspection alignment. A height measuring circuit is activated when a container is sensed in inspection alignment.

13 Claims, 10 Drawing Figures

PATENTED JUN 25 1974

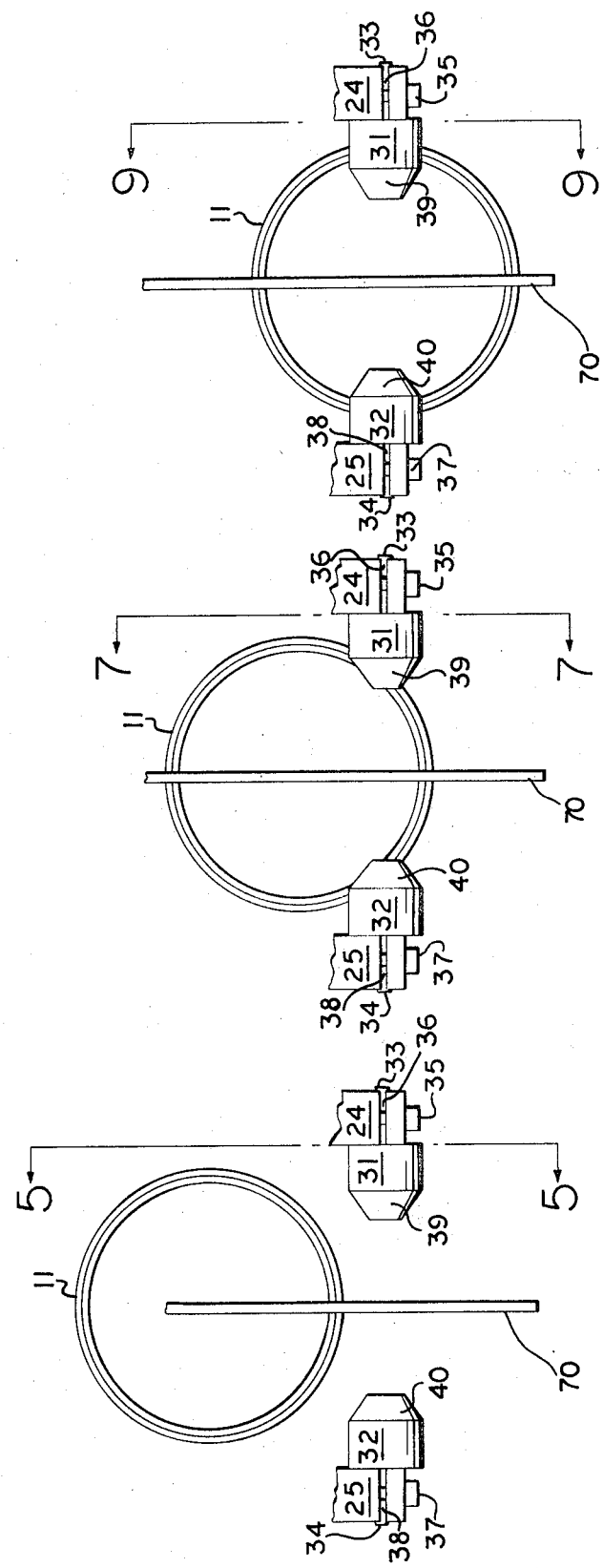

BOTTLE GAUGING APPARATUS AND METHOD

BACKGROUND OF THE INVENTION

1. Field of the Invention

This invention relates generally to the inspection of containers and in particular to the gauging of hollow containers such as glass bottles and jars to determine whether the containers are within height tolerances and whether the top sealing surface is within proper specification.

2. Description of the Prior Art

Glass containers such as bottles and jars are presently handled by automatic equipment in the packers' plants. This equipment is of the high speed type. Thus it becomes essential that certain dimensions and tolerances be maintained in the manufacture of the glass containers and particularly in the top surface of the finish of the container when the top surface is used for sealing.

The dimensional defects which have been determined as critical include moderate variations in slope of the top surface of the finish as evidenced by variations in height of the top surface around a portion of the periphery, commonly known as "warp." More abrupt variations in the slope of the top surface of the finish, as evidenced by variations in the height of the top surface around a lesser portion of the periphery than for warp, are known as "dips."

A further defect known as "cocked finish" is evidenced by extreme variations between the highest point and the lowest point on the top surface. This defect is also known as "tilt finish."

A still further common defect which must be gauged is "over and underheight." As would be expected, if the container itself is too high, it may jam the equipment used for filling and sealing the container, or if the container is too short, again the sealing equipment would not operate satisfactorily, thus resulting in the improperly filled or sealed container.

Attempts have been made to provide equipment which can be adapted to automatic inspection devices or used independently, as in U.S. Pat. No. 3,420,369 issued to this inventor. In the mentioned patent, the container was brought under the apparatus and then elevated into gauging position. This procedure was very slow. Attempts were made to eliminate this time loss and move the containers directly into position for gauging without vertical displacement.

A problem with such devices, however, is that when they are employed on high-speed equipment, there is a possibility of damage to the container and to the gauging rollers when the containers are moved into position for inspection. If the arms and rollers used to measure planar variation in the container rim are set low enough to detect missing bottles as well as those below acceptable height tolerances, then the rollers are so low that there is substantial lateral impingement on the side of containers having acceptable height. This impingement may cause damage to the container or to the gauging rollers. It is undesirable to slow the operation down to reduce the effect of this lateral impingement at the time the container is moved into inspection alignment.

At the same time, if the downward travel of the rollers used to measure the rim is restricted to allow for high-speed operation without causing damage to the containers or to the rollers, then containers which are too short might pass through the apparatus without being detected and rejected. Also, it is desirable to activate the underheight detector only when a bottle is present to avoid false accounting of off-ware.

SUMMARY OF THE INVENTION

An apparatus for inspecting the rim of a hollow glass container such as a bottle or jar for height and planar deviation or "warp." The container is moved into the apparatus and slidingly engages tapered guide members which are attached to contact members that are positioned to engage diametrically opposed points on the container rim. As the container moves into alignment for inspection, the guide members are moved vertically upward by the engagement with the moving container rim. The tapered members raise the contact members just to the height at which they contact the rim of the container for gauging. This gradual sliding engagement prevents damage to the container rim and to the contact members. The tapered guide members also help to center the container for inspection. In order to allow these guide members and contact members to be set up near the normal height of a container rim, a separate arm engageable with the rim of the container is provided to sense the absence of a container. By so doing, the apparatus may be operated at higher speeds without damage to the container or the gauging members, yet still allow the measurement of height and planar deviation simultaneously.

BRIEF DESCRIPTION OF THE DRAWINGS

FIG. 4 is a plan view of a portion of the apparatus shown in FIG. 1, not yet engaged by a container.

FIG. 6 is a plan view of the apparatus of FIG. 4 with the container advanced to a position of engagement with the apparatus.

FIG. 8 is a plan view of the apparatus of FIG. 4 with the container advanced into inspection alignment with the apparatus.

DESCRIPTION OF THE PREFERRED EMBODIMENT

Figure 1:
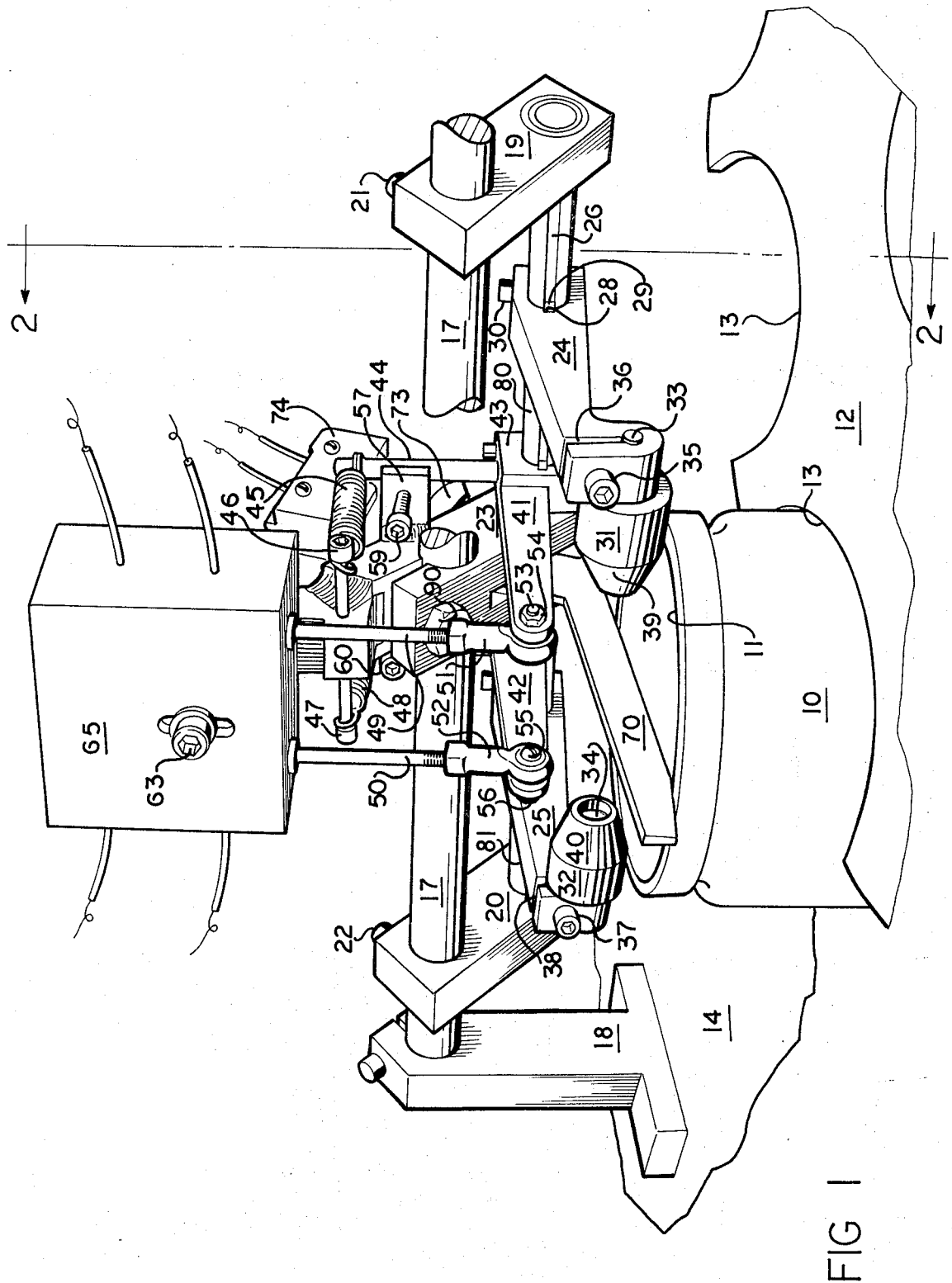
FIG. 1 is a perspective view of an apparatus embodying the disclosed invention.

Referring to FIG. 1, the apparatus is intended for inspecting hollow glass containers such as a jar shown as 10. The jar 10 is of the wide-mouth type, having an open upper end commonly referred to as the "finish," whose upper annular surface or rim is normally a sealing surface 11 for closures such as lids or caps (not shown).

The jar 10 is typically brought into inspection alignment by automatic transfer equipment such as that shown in U.S. Pat. No. 3,313,409 to Johnson. The transfer mechanism is referred to in the art as a "starwheel," shown in FIGS. 1 and 2 as 12. The "starwheel" 12 has circumferentially spaced pockets 13 which engage the jar 10 and move it along on a plate 14 when the "starwheel" 12 is rotated.

Figure 2:
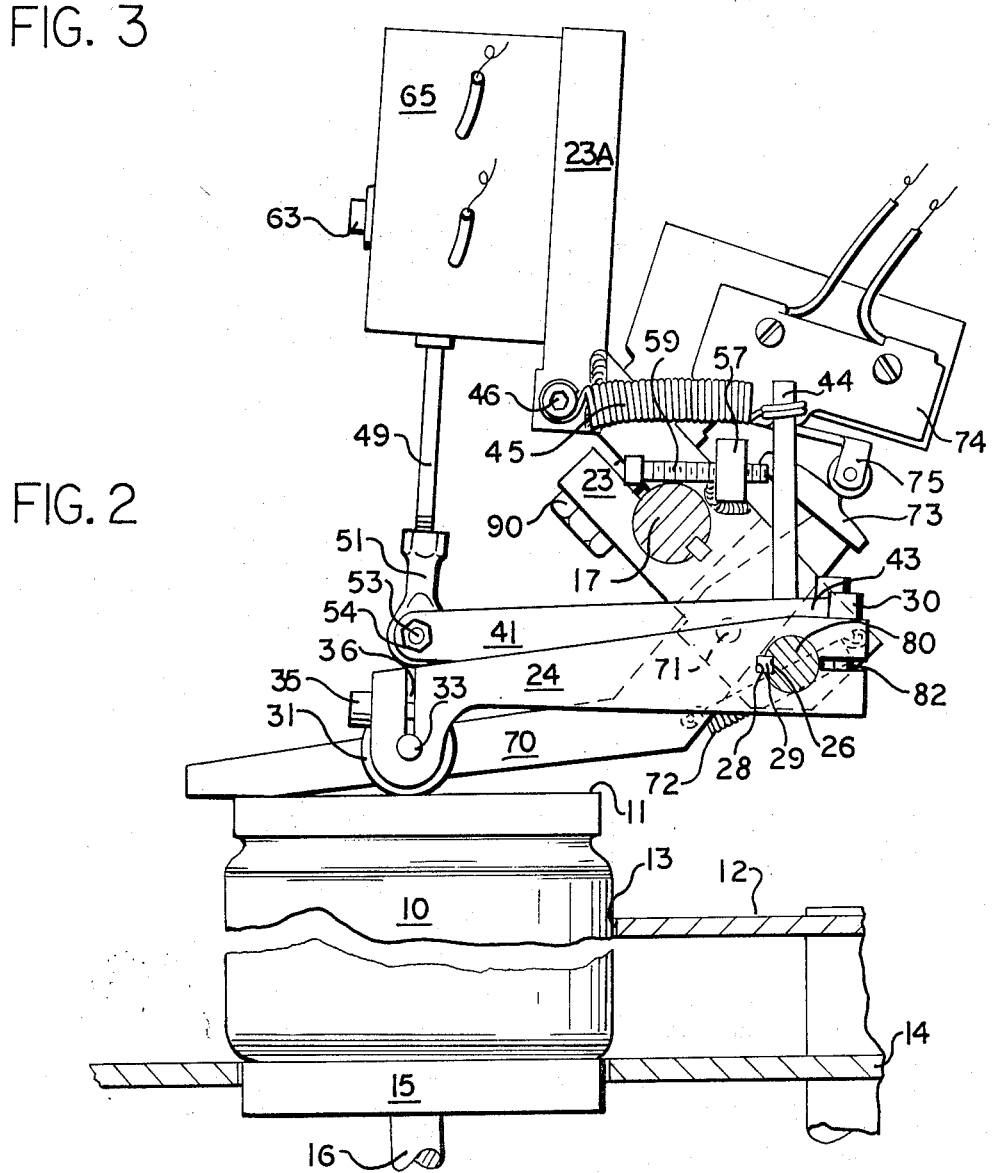
FIG. 2 is a side elevational view of the apparatus of FIG. 1, taken along section line 2—2 in FIG. 1.

The FIGS. 1 and 2 illustrate the apparatus with a jar 10 in inspection alignment. As can be seen in FIG. 2, a container support means 15 is shown, and the jar 10 is positioned with its vertical axis aligned with the vertical axis of the container support means 15. The support 15 is in the form of a pedestal mounted in an opening in the plate 14, and may be rotated by an attached shaft 16 which is driven by a motor (not shown).

The rotation of the support means 15 results in rotation of the jar 10 and provides relative movement between the rim 11 and the remainder of the apparatus.

The apparatus is supported on a fixed shaft 17, shown broken in FIG. 1. One end of shaft 17 is supported by a bracket 18 which is, in turn, mounted on the plate 14. The other end of shaft 18 is attached to framework on the "starwheel" 12 support mechanism (not shown). Shaft 17 does not rotate.

Two fixed brackets 19 and 20 are clamped to shaft 17 by threaded fasteners 21 and 22, respectively. The brackets 19 and 20 are spaced apart and on either side of the center of the apparatus and jar 10. The brackets 19 and 20 extend downward from the shaft 17, and away from the position of jar 10.

A center mounting bracket 23 is also attached to shaft 17 and extends downward parallel to brackets 19 and 20. Mounting bracket 23 does not rotate and is clamped in position by threaded fastener 90. The bracket 23 also has an upward extending vertical portion 23A, seen best in FIG. 2.

The mounting bracket 23 serves as a center mount for the inward facing ends of each of two rotatable horizontal shafts 80 and 81, which have their opposite ends mounted for rotation in the lower ends of brackets 19 and 20 respectively. Shaft 81 can only be seen in FIG. 1. Shafts 80 and 81 are capable of independent rotational movement.

Each rotatable shaft 80 and 81 has attached thereto a gauge arm 24 or 25, respectively, which extends horizontally from and perpendicular to the rotatable shafts 80 and 81. These gauge arms 24 and 25 are spaced apart and centered about the axis of rotation of the jar 10 when in position for gauging.

Shaft 80 has a keyway 26 formed the length thereof which is employed in the mounting of arm 24 to prevent rotation of arm 24 about shaft 80. Shaft 81 has a similar keyway (not shown). Each gauge arm 24 and 25 has a corresponding keyway to the keyways in the shafts 80 and 81. Only the keyway in arm 24 may be seen in FIGS. 1 and 2 and is designated 28. A key 29 fits in the two adjacent and aligned keyways 26 and 28 to prevent rotation of arm 24 about shaft 80. A similar arrangement is used in arm 25, but is not visible in the drawings.

A clamp arrangement is also provided to attach each arm 24 or 25 to the shafts 80 or 81. Only the clamp for arm 24 may be seen, and is seen best in FIG. 2. It consists of a threaded fastener 30 extending through a slot 82 to clamp down on shaft 80.

Figure 3:
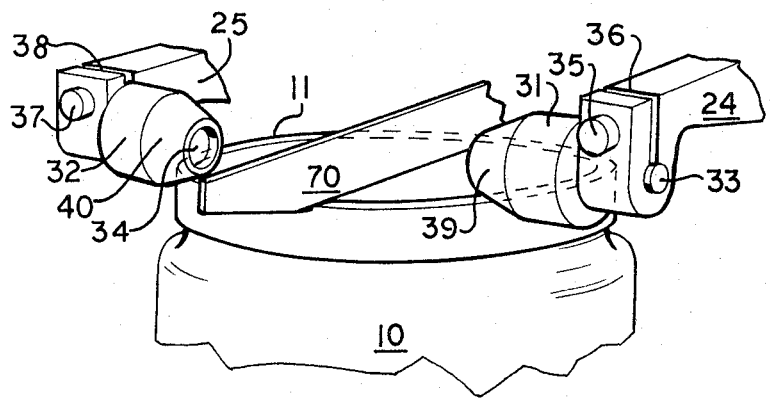
FIG. 3 is a perspective view of a portion of the apparatus shown in FIG. 1.

At the opposite end of arms 24 and 25 are mounted rotatable rollers which serve as contact members 31 and 32, respectively. These contact members 31 and 32 are inwardly facing and are spaced apart a distance to allow them to contact the rim 11 of a container which is in alignment for inspection. The contact members 31 and 32 are mounted on small axles 33 and 34, respectively. The axles 33 and 34 are clamped in horizontal position by threaded fastener 35 in a slot 36 formed in arm 24, and a threaded fastener 37 in a similar slot 38 formed in arm 25. This is best seen in FIG. 3.

It can be seen that, as the container 10 is rotated, the contact members 31 and 32 are free to roll on the rim 11 of the container 10 at diametrically opposed points.

The keyways 26 and 27 in shafts 80 and 81 allow for adjustment of the arms 24 and 25 to accommodate jars 10 with different diameters.

Mounted inwardly from each contact member 31 or 32 are tapered guide members 39 and 40, respectively. These guide members 39 and 40 also are mounted on axles 33 and 34, respectively and are free to rotate.

Also attached to shafts 80 and 81 are connecting arms 41 and 42, respectively. Arm 42 is only visible in FIG. 1. Each arm 41 or 42 is mounted rigidly on shaft 80 or 81, so that the arm 41 or 42 cannot rotate about the shaft 80 or 81. As seen in FIG. 1, arm 41 is attached to shaft 80 by a mount 43. A similar mount for arm 42 is not visible.

Means biasing each shaft 80 or 81 and corresponding pair of arms 24 and 41 or 25 and 42 downward is provided. The means for shaft 81 may be seen best in FIGS. 1 and 2, and includes a vertical post 44 attached to the mount 43 on connecting arm 41. A coiled spring 45 extends from the post 44 to an anchor screw 46 mounted in a vertical extension of the mounting bracket 23, shown as 23A. The spring 45 biases the connecting arm 41 downward, which in turn biases the gauge arm 24 downward, since both are connected to shaft 80. This biases the contact member 31 against the rim 11 of a jar 10 in position for inspection.

Since the shafts 80 and 81 are independent of each other, separate biasing means are provided for each connecting arm 41 and 42. Only part of a spring 48 may be seen in FIG. 1 which is attached to a vertical post (not shown) attached to a mount (not shown) on connecting arm 42. The spring 48 connects to an anchor screw 47, which is similar to the anchor screw 46 and is mounted in mounting bracket 23A, but on the opposite side from anchor or screw 46.

A pair of flanges are affixed to either side of the mounting bracket 23 and extend outwardly therefrom. Only one of these, shown as 57, may be seen in FIGS. 1 and 2. A threaded stop rod 59 is mounted in flange 57. The stop rod 59 is a stop for vertical rod 44 and limits its movement caused by the spring 45. This adjustment dictates how far below the rim 11 of a jar 10 the contact member 31 will be prior to a jar 10 being moved into the apparatus for inspection.

A similar stop rod 60 is located on the opposite side of the bracket 23. Only the end of the rod 60 is visible in FIG. 1. Stop rod 60 serves to limit the travel of contact member 32 when a jar 10 is not in inspection alignment.

At the ends of connecting arms 41 and 42 are mounted vertical rods 49 and 50. These rods 49 and 50 are adapted with screw threads at their lower ends and are each fitted into a rotatable connection on the end of each arm 41 or 42. As can be seen in FIGS. 1 and 2, a rotatable connector 51 is attached to arm 41 by a pin 53 which acts as an axle for rotation of connector 51 with respect to arm 41. The pin 53 is held in place by a threaded nut 54.

Similarly, as seen in FIG. 1, a rotatable connector 52 is attached to connecting arm 42 by a pin 55 and a nut 56.

As can be seen in FIG. 2, the length of the gauge arms 24 and 25 is equal to the length of connecting arms 41 and 42. Thus, vertical defection of the gauge arms 24 or 25 is accurately reproduced in the connecting arms 41 or 42.

The cores or armatures of a pair of differential transformers are connected to the upper ends of vertical rods 49 and 50. The transformers are not shown, but are encased in the insulating block 65 shown in FIGS. 1 and 2. The transformers are represented by 61 and 62 in FIG. 10.

The block 65, which contains the transformers 61 and 62, is attached to the vertical portion of the mounting bracket 23A by a threaded fastener 63.

A container rim sensing means is shown in FIGS. 1 and 2, which includes an arm means 70, which is suspended between the contact members 31 and 32 to contact the rim 11 of a jar 10 as it is moved into position for inspection by the starwheel 12. The arm means 70 has an upward extending portion which is mounted in a bifurcated section of mounting bracket 23. The mounting is accomplished by a pivot pin 71. The arm means 70 is thereby capable of pivoting movement about the pin 71.

The arm means 70 is biased downward by a spring 72, shown in FIG. 2 extending between the arm means 70 and the mounting bracket 23.

As seen in FIG. 2, the upper portion of the arm means 70 has a lifting cam 73 attached thereto which has an upper and a lower surface. A switch 74 is attached to the mounting bracket 23 and has a switch arm 75 which rides on the cam 73. When a bottle is moved under the arm means 70, the arm means 70 is pivoted by the jar 10, moving the cam 73 clockwise in FIG. 2. The switch arm 75 then is deflected by the upper portion of the cam 73, activating switch 74 by closing the switch contacts (not shown) which energizes the underheight detection circuitry. When a container or jar 10 is absent, the switch 74 is not activated.

OPERATION OF THE PREFERRED EMBODIMENT

Figure 5:
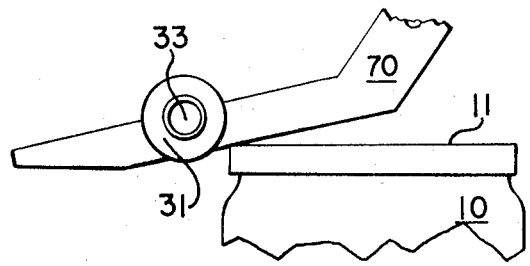
FIG. 5 is a side elevation view of the apparatus shown in FIG. 4 taken along section line 5—5.

A jar 10 is brought under the apparatus and into inspection alignment by the starwheel 12. As can be seen in FIGS. 4 and 5, the contact members 31 and 32, as well as the arm means 70, are initially at rest below the level of the rim 11 of the jar 10 which is about to be inspected.

Figure 7:
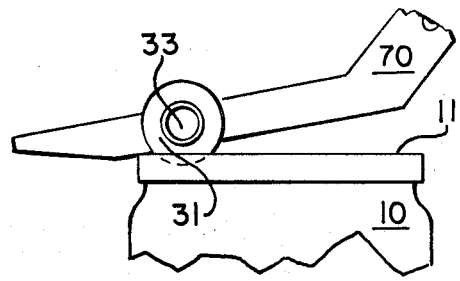
FIG. 7 is a side elevation view of the apparatus shown in FIG. 6, taken along section line 7—7.

As shown in FIGS. 3, 6 and 7, when the container or jar 10 is advanced, the initial contact is with the tapered guide members 39 and 40. As the jar 10 is moved further, the guide members 39 and 40 are raised as a larger sector of the rim 11 is engaged.

The guide members 39 and 40 raise the contact members 31 and 32, as well as the gauge arms 24 and 25 until the rim 11 is engaged by the contact members 31 and 32. This gradual elevating process prevents damage to the rim 11 or the contact members 31 and 32. The tapered members 39 and 40 also tend to help center the jar 10 when it is moved under the apparatus.

Figure 9:
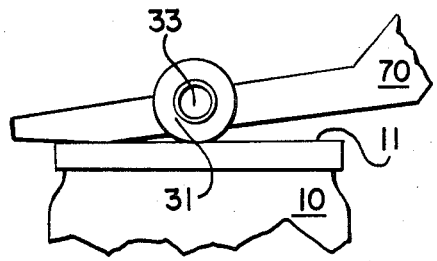
FIG. 9 is a side elevation view of the apparatus of FIG. 8, taken along section line 9—9.
Figure 10:
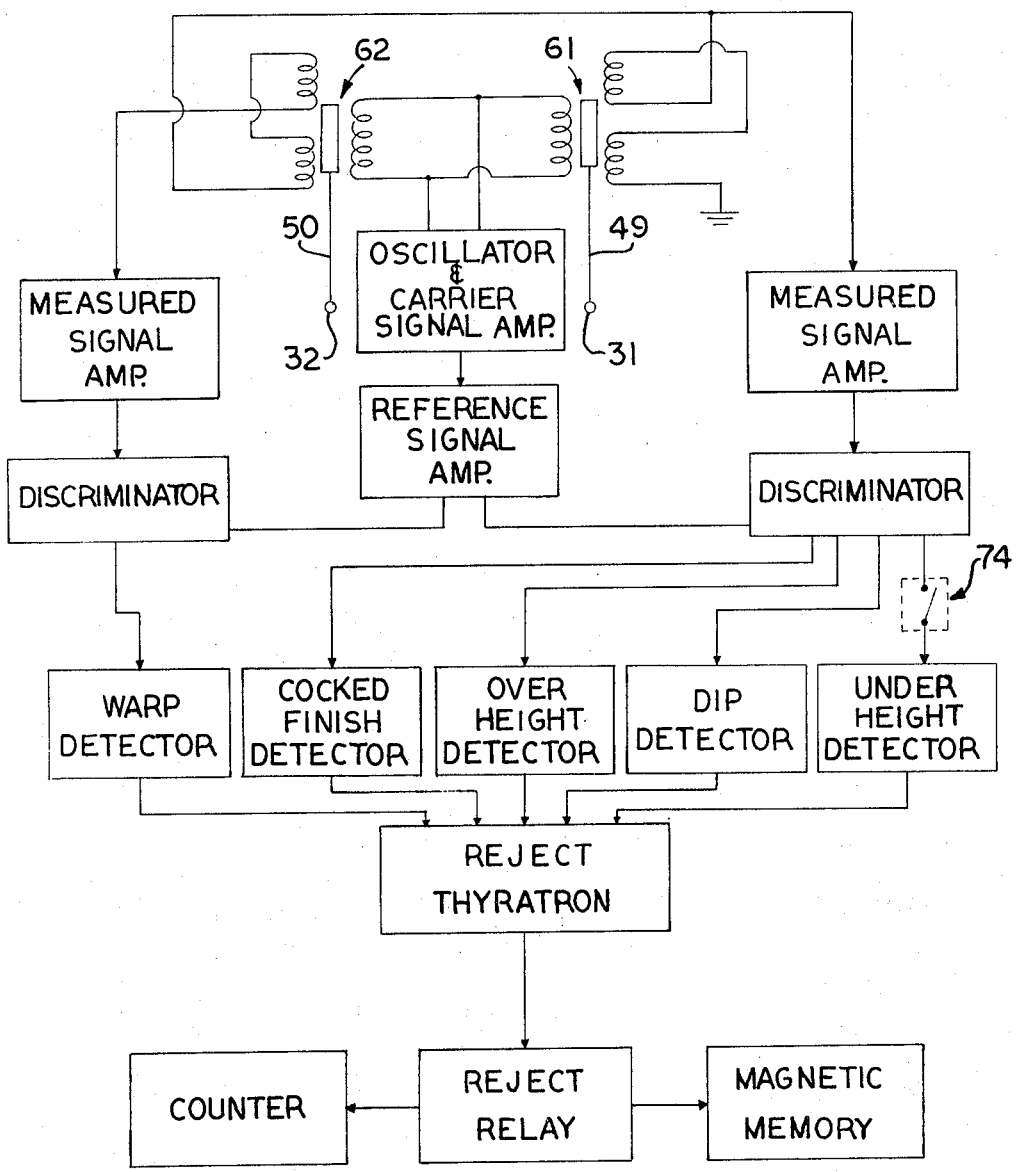
FIG. 10 is a block diagram of the electronic circuitry used for analyzing the signals from the differential transformers and height gauge.

FIGS. 8 and 9 show the arm means 70 engaged with the rim 11 of the jar 10. If the jar 10 is absent, the switch 74 is not activated by the cam 75, and the underheight circuitry would remain idle. As can be seen in FIG. 10, an underheight jar 10 would activate the switch 74 and the underheight apparatus, resulting in activation of the reject mechanism in the same manner as that described in U.S. Pat. No. 3,273,710 and U.S. Pat. No. 3,420,369, applicant being inventor or co-inventor in both.

As mentioned earlier, if the system for detecting an absence of a bottle 10 is incorporated into one or both of the gauge arm mechanisms, then the contact members 31 and 32 must be positioned so low during transfer of a jar 10 that substantial lateral impingement occurs between the rim 11 and the contact members 31 and 32. The present invention avoids any damage from such impingement and allows for higher operating speeds as well as accurate counts of missing ware and short ware.

It is to be understood that in the preferred embodiment described, the overheight detector is activated by signals from one of the two gauge arms similar to the underheight detection apparatus.

The operation of the apparatus, once a jar 10 is in position for inspection, is similar to that described in the above-mentioned U.S. Patents.

I claim:

1. In an apparatus for inspecting the rim of a hollow glass container which is moved horizontally into inspection alignment, wherein two contact members are adapted to contact diametrically opposed points on the rim of a container, wherein means provide relative movement between the container and said members, whereby the members traverse the entire rim of the container, wherein a pair of pivotally mounted arms are connected to and support said members for independent vertical movement and are biased downward to maintain the members in contact with the rim, wherein there are a pair of differential transformers, wherein there are core means movable axially in each of said transformers to produce output voltage signals which vary in phase and amplitude, depending upon the relative position of the cores and electrical centers thereof, wherein means connect said contact members to the cores of said transformers, wherein circuit means interconnect the output signals of said transformers in series adding relationship, and wherein means are connected to said circuit means for indicating an output signal from one or both of said transformers which exceeds a predetermined value, the improvement therein comprising: a pair of tapered guide members positioned adjacent to and coaxially with said contact members on the inward facing ends of said contact members, said tapered guide members positioned to guide said containers into alignment for inspection, and raise said contact members to the level of contact position with said rim as said container is moved into alignment for inspection.

2. The apparatus of claim 1, wherein said contact members comprise a pair of coaxially aligned rollers mounted for rolling contact with the rim of the container being inspected.

3. The apparatus of claim 1, wherein said tapered guide members comprise a pair of tapered rollers mounted for rolling contact with the rim of the container during alignment of said container.

4. The apparatus of claim 1, wherein said apparatus is adapted to be used as one of a series of inspection devices in an automatic glass container inspection means in which a container is conveyed to said container inspection means, inspected, and thereafter rejected or conveyed away from said container inspection means for further processing, said means for indicating an output signal from said transformers communicating with said container inspection means to automatically reject containers having a variation in rim height greater than a predetermined value or having rim height greater or less than predetermined values.

5. Apparatus for sensing the presence of a glass container said apparatus being adapted to be incorporated into one of a series of inspection devices in an automatic glass container inspection means in which a container is horizontally conveyed to said container inspection means, inspected for planar deviation and rim height, and thereafter rejected or conveyed away from said container inspection means for further processing, comprising:
   a. support means for said container, said container movable horizontally onto said support means;
   b. a mounting frame located at said support means;

c. arm means attached to said mounting frame for mechanical engagement with the rim of said container, said arm means vertically positioned on said rim by said mechanical engagement with said container;
   d. means sensing the vertical position of said arm means and producing a first output signal when said arm means is positioned beyond a predetermined location by the presence of a container rim, said means for producing an output signal when said arm means is sensed beyond a predetermined location communicating with said container inspection means to activate said automatic inspection means for rim height inspection when a container is present.

6. Apparatus for inspecting the rim of a hollow glass container for height and planar deviation, where the container is moved horizontally into inspection alignment with said apparatus, comprising:
   a. means to support said container, said glass container movable horizontally onto said support means for inspection;
   b. a mounting frame located at said support means;

c. arm means attached to said mounting frame for mechanical engagement with the top rim of said container, said arm means vertically positioned by said mechanical engagement with said container;
   d. means sensing the position of said arm means and producing an output signal when said arm means is positioned beyond a predetermined location by the presence of said container to activate said rim height inspection apparatus;
   e. two contact members adapted to contact diametrically opposed points on said rim of said container;

f. a pair of tapered guide members positioned adjacent to and coaxially with said contact members, said tapered guide members positioned to guide said container into alignment for inspection as said container is moved into said support means, and raise said contact members to the level of contact position with said rim as said container is moved into alignment for inspection;
   g. means providing relative movement between said container and said contact members whereby said contact members traverse the entire rim of said container while in inspection alignment;
   h. means supporting said contact members to allow independent vertical movement of said contact members, and biased downward to maintain said contact members in contact with said rim; and
   i. means sensing the vertical position of each of said contact members and producing an output signal when one or the sum of the vertical positions of said contact members deviates beyond predetermined values.

7. The apparatus of claim 6, wherein said contact members comprise a pair of coaxially aligned rollers mounted for rolling contact with the rim of the container being inspected.

8. The apparatus of claim 6, wherein said tapered guide members comprise a pair of tapered rollers mounted for rolling contact with the rim of the container during alignment.

9. The apparatus of claim 6, wherein said apparatus is adapted to be used as one of a series of inspection devices in an automatic glass container inspection means in which a container is horizontally conveyed to said container inspection means, inspected, and thereafter rejected or conveyed away for further processing, said means for sensing the position of said contact members communicating with said automatic container inspection means to automatically reject containers having rim height or variation in rim height beyond a predetermined value.

10. In the method of moving a hollow glass container into and out of an apparatus for inspecting the rim thereof, wherein said inspection involves bringing a pair of contact members into contact with the top surface of said rim at diametrically opposed points, whereby relative motion is caused between said container and said contact members to cause said contact members to traverse the entire top surface of said rim of said container, whereby the vertical positions of said contact members will vary in accordance with the height of the rim, whereby said variance in height is continuously sensed and whereby said container is rejected when said variance exceeds a predetermined value or when said rim height exceeds a predetermined value, the improvement in said method which comprises the steps of:
   a. moving the container into contact with one or both of a pair of diametrically opposed tapered guide members supported by said apparatus and located inwardly from said contact members, and connected to said contact members; and
   b. causing relative motion between said container and said guide members, whereby the vertical position of said contact members is raised to a position for contact with said rim, thereby providing clearance for said container to move into and out of inspection alignment with said apparatus without impingement by said contact members upon said rim unless said container is in position for inspection.

11. The method of claim 10, wherein said contact members comprise coaxially aligned rollers mounted for rolling contact with the rim of the container being inspected.

12. The method of claim 10, wherein said tapered guide members comprise a pair of tapered rollers mounted for rolling contact when in contact with the rim of the container during movement into and out of inspection alignment.

13. The method of claim 10, including the steps of sensing the presence of said container as said container is in inspection alignment and activating said rim height inspection apparatus only when a container is present.

* * * * *